April 1, 1958 — H. R. CHOPE — 2,829,268
STANDARDIZATION SYSTEM
Filed May 5, 1952 — 5 Sheets-Sheet 1

INVENTOR.
HENRY R. CHOPE
BY *Philip M. Dunson*
ATTORNEY

April 1, 1958  H. R. CHOPE  2,829,268
STANDARDIZATION SYSTEM
Filed May 5, 1952  5 Sheets-Sheet 3

INVENTOR.
HENRY R. CHOPE
BY Philip M. Dunson
ATTORNEY

April 1, 1958 H. R. CHOPE 2,829,268
STANDARDIZATION SYSTEM
Filed May 5, 1952 5 Sheets-Sheet 4

INVENTOR.
HENRY R. CHOPE
BY Philip M. Dunson
ATTORNEY

April 1, 1958     H. R. CHOPE     2,829,268
STANDARDIZATION SYSTEM
Filed May 5, 1952     5 Sheets-Sheet 5

*INVENTOR.*
HENRY R. CHOPE

ATTORNEY

United States Patent Office 2,829,268
Patented Apr. 1, 1958

2,829,268

STANDARDIZATION SYSTEM

Henry R. Chope, Columbus, Ohio, assignor to Industrial Nucleonics Corporation

Application May 5, 1952, Serial No. 286,220

18 Claims. (Cl. 250—83.6)

This invention relates to a standardization system. It has to do, more particularly, with a system for standardization in equipment used to measure the value of a variable characteristic translatable into voltage. In this system means are provided for standardizing to prevent errors that might otherwise be present in translating the variable characteristic to be measured into a voltage, and means are also provided for standardizing to prevent errors that might otherwise arise in the measurement of such voltage.

The standardization system of this invention has many applications. It is particularly useful in non-contacting thickness gauges in which the thickness of a material is determined as a measure of the relative absorption of sub-atomic particles, such as beta rays, by such material. For convenience of illustration the invention is herein described as embodied in such measuring equipment. Some of the features of the equipment disclosed for completeness of description but not claimed herein are claimed in the copending application for U. S. Letters Patent of Henry R. Chope, Serial No. 286,219, now Patent No. 2,790,945.

A primary object of this invention is to provide a standardization system having the foregoing features and advantages.

Another object of this invention is to provide a system of automatic standardization particularly useful in measuring equipment utilizing radiation, in which the same source of radiation is used in standardizing as is used in measuring.

A further object is to provide means for automatically providing the desired standardization at predetermined intervals and for automatically returning the measuring equipment involved to its normal measuring function when such standardization has been completed.

An additional object of the invention is to provide, in a radiation thickness guage of the type described above, means for removing the material whose thickness is being measured from the radiating and detecting elements of such radiation thickness gauge during the standardization of said thickness gauge to prevent errors that might otherwise arise from changes in said radiation source or in said detector.

It is also an object of this invention to provide, in a system for measuring the value of a variable characteristic translatable into voltage, means for standardizing said measuring system to a known value of said variable characteristic, such as a boundary value, using the same means for translating said variable characteristic into voltage during standardization as are used to translate said variable characteristic into voltage during the measurement of said characteristic. And an additional object is to provide in such standardizing means, automatic means for providing said known value of said variable characteristic.

Other objects and advantages of the invention will be apparent from the following description.

Figure 1:
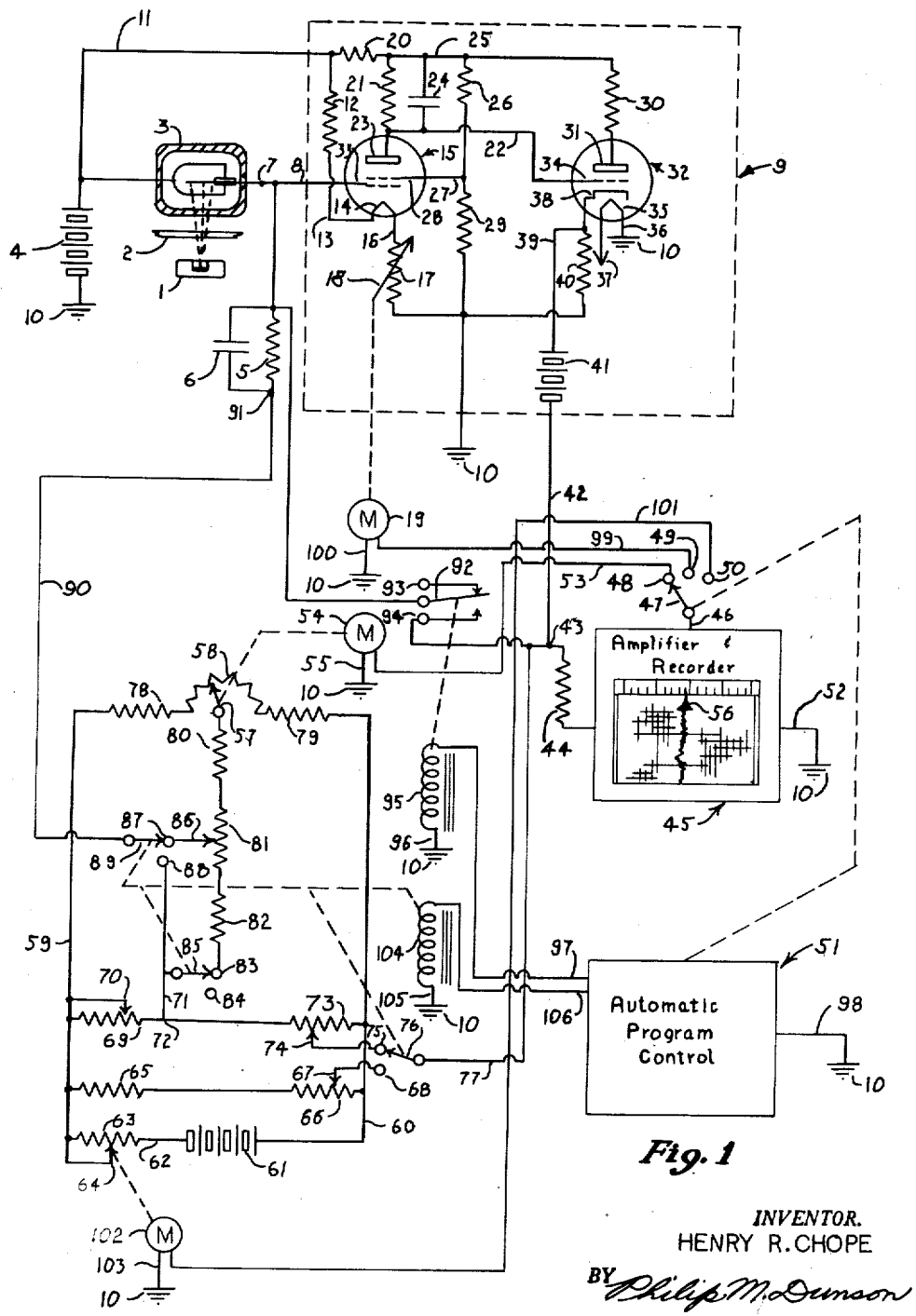
Figure 1 is a schematic view, partially in block-diagram form, illustrating a thickness measuring gauge incorporating features of the present invention.

Attention is now directed to Figure 1 which illustrates schematically a thickness measuring gauge incorporating features of the present inveention. A radiation source 1 which may comprise any suitable radioactive material such as strontium 90 or carbon 14, is constructed and positioned so as to direct a beam of rays, such as beta rays, through the material 2 to be measured and toward a detector 3. The radiation detector 3 may be of any suitable type such as an ionization chamber, a Geiger-Muller tube or a scintillation detector. For purposes of illustration the radiation detector 3 is shown in Figure 1 as an ionization chamber.

A battery 4, or other suitable voltage source, provides the desired potential, commonly 300 volts, to the radiation detector 3. Radiation reaching the detector 3 from the radiation source 1 permits a minute current to flow through a high resistance 5 and other circuit elements. The high resistance 5 commonly has a resistance value in the neighborhood of 1000 megohms to 2000 megohms and the minute current produced by the radiation provides a voltage across the high resistance 5. The total resistance of the other elements through which this minute current flows is much less than 0.1% of the resistance of the high resistance 5, so the minute voltage produced across the other elements is negligible in comparison to the voltage produced across the high resistance 5.

The magnitude of the current flowing in the high resistance 5 is determined by the rate at which radiation reaches the detector 3. The rate of arrival of the radiation to the detector 3 is determined by the nature of the radiation source 1 and the absorption by the material 2. For a given source of radiation 1 and for a given material to be measured 2, the voltage produced across the high resistance 5 is a function of the thickness of the matereial 2. The instantaneous current provided by the radiation detector 3 varies rapidly about an average value. To smooth out the voltages produced by this varying current through the high resistance 5 a time-constant capacitor 6 is connected in parallel with the high resistance 5.

The voltage at the point 7 where the high resistance 5 and the time constant capacitor 6 are connected to the radiation detector 3 is connected by a line 8 to the input circuit of a direct-coupled amplifier indicated generally by the numeral 9. The direct-coupled amplifier 9 comprises an electrometer input stage and a cathode follower ouput stage. An electrometer is a high impedance amplifier stage particularly suited for the amplification of minute currents. The cathode follower serves as an impedance matching device.

The power to operate the direct-coupled amplifier 9 is supplied by the voltage source 4. The negative side of the voltage source 4 is grounded as is indicated at 10. The positive side of the voltage source 4 is connected by a line 11 to a filament dropping resistor 12 the other end of which is connected by a line 13 to one side of the filament 14 of the electrometer tube 15. The other end of the filament 14 is connected by a line 16 to one end of a zeroing potentiometer 17 the other end of which is grounded as indicated at 10. Also connected to the line 16 is an arm 18 of the zeroing potentiometer 17. The position of the arm 18 on the potentiometer 17 is controlled by a zero-standardize servo-motor 19 mechanically connected thereto.

The line 11 from the positive terminal of the voltage source 4 is connected also to one end of a voltage dropping resistor 20. The other end of the resistor 20 is connected to one end of a plate load resistor 21 the other end of which is connected by a line 22 to the plate 23 of the electrometer tube 15. A filter capacitor 24 is connected by the lines 22 and 25 across the plate load resistor 21 to reduce the effect of alternating and transient voltages at the plate 23 of the electrometer tube 15. The line 25 is connected from the junction of the resistors 20 and 21 to one end of a voltage divider resistor 26, the other end of which is connected by a line 27 to the screen grid 28 of the electrometer tube 15. The line 27 is also connected to a second voltage divider resistor 29, the other end of which is grounded as indicated at 10. The proper voltage is thereby provided to the screen grid 28 of the electrometer tube 15. The line 25 is also connected to one end of a resistor 30 the other end of which is connected to the plate 31 of the electrometer tube 32 to provide the proper plate voltage thereto.

The line 8 connects the voltage at the point 7 to the control grid 33 of the electrometer input tube 15. The amplified voltage at the plate 23 of the electrometer tube 15 is connected by the line 22 to the grid 34 of the cathode follower output tube 32. One end of the heater 35 of the cathode follower tube 32 is connected by a line 36 to ground as indicated at 10, and the other end of the heater 35 is connected by a line 37 to a suitable source of heater voltage which may comprise a conventional step down transformer connected to the usual 110-volt alternating-current power lines. The cathode 38 of the cathode follower output tube 32 is connected by a line 39 to one end of an output load resistor 40 the other end of which is grounded as indicated at 10. The line 39 is also connected to one terminal of a battery or other suitable voltage source 41, the other terminal of which is connected to an output line 42. The output line 42 is connected to a point 43 to which is connected one end of a feedback resistor 44, the other end of which is connected through the low-impedance input end of an amplifier-recorder indicated generally by the numeral 45, to ground as indicated at 10.

The output of the amplifier-recorder 45 is connected by a line 46 to a contact arm 47 which is associated with the contact points 48, 49 and 50 and is operatively connected with an automatic program control indicated generally by the numeral 51. When the equipment of Figure 1 is performing its usual measuring function the contact arm 47 is in the position shown in Figure 1 in engagement with the contact point 48. The amplifier-recorder 45 is grounded through the line 52 as indicated at 10. With the contact arm 47 in the "operate" position shown in Figure 1, the output of the amplifier-recorder 45 is connected through the line 46, the contact arm 47, the contact point 48, and a line 53 to one terminal of an indicator servo-motor 54, the other terminal of which is connected by the line 55 to ground as indicated at 10. The indicator servo-motor 54 is mechanically connected to a recording and indicating arm 56 of the amplifier-recorder 45, and is mechanically connected to a movable arm 57 on a variable voltage divider or slide wire 58 which is part of a bucking voltage circuit.

A voltage is supplied across the lines 59 and 60 by a battery or other suitable voltage source 61, the positive terminal of which is connected to the line 60 and the negative terminal of which is connected by a line 62 to one end of a source-standardize potentiometer 63, the other end of which is connected to the line 59. A movable arm 64 on the source-standardize potentiometer 63 is also connected to the line 59. The line 59 is connected to one end of a resistor 65. The other end of the resistor 65 is connected to one end of a potentiometer 66, the other end of which is connected to the line 60. The potentiometer 66 includes an adjustable arm 67 which is connected to a contact point 68. The line 59 is connected to one end of a potentiometer 69 and to a movable arm 70 on the potentiometer 69. The other end of the potentiometer 69 is connected by a line 71 to a point 72. The line 71 is also connected to one end of a center-scale potentiometer 73 the other end of which is connected to the line 60. The center-scale potentiometer 73 includes an adjustable arm 74 which is connected to a contact point 75. A movable contact arm 76 is connected by a line 77 to the point 43. The movable arm 76 is associated with the contact points 68 and 75, and during the usual measuring function of the equipment of Figure 1 is in engagement with the contact point 75 as shown in Figure 1.

The line 59 is connected to one end of a resistor 78 the other end of which is connected to one end of the slide wire 58. The other end of the slide wire 58 is connected to a resistor 79 the other end of which is connected to the line 60. The movable arm 57 of the slide wire 58 is connected to one end of a resistor 80, the other end of which is connected to one end of a span potentiometer 81. The other end of the span potentiometer 81 is connected to a resistor 82 the other end of which is connected to a contact point 83. The contact point 83 and a floating contact point 84 are associated with a movable contact arm 85 which is connected to the line 71. The span potentiometer 81 includes a movable arm 86 which is connected to a contact point 87. Associated with the contact point 87 and with a second contact point 88 which is connected to the line 71, is a movable contact arm 89. The movable contact arm 89 is connected by a line 90 to the point 91 at one end of the high resistance 5. During normal measurement the movable contact arm 89 remains in engagement with the contact point 87 as shown in Figure 1.

Connected to the line 8 of the input circuit to the direct-coupled amplifier 9 is a movable contact arm 92, which is associated with a floating contact point 93 and with a second contact point 94 which is connected to the line 77. The movable contact arm 92, which during measurement remains in engagement with the floating contact point 93, is controlled by a zero-relay coil 95, one end of which is connected by a line 96 to ground as indicated at 10, and the other end of which is connected by a line 97 to the automatic program control 51. The automatic program control 51 is connected by a line 98 to ground as indicated at 10. The contact point 49 associated with the movable contact arm 47 is connected by a line 99 to one terminal of the zero-standardize servo-motor 19, the other terminal of which is connected by a line 100 to ground as indicated at 10. The contact point 50 associated with the movable contact arm 47 is connected by a line 101 to one terminal of a source-standardize servo-motor 102, the other end of which is connected by a line 103 to ground as indicated at 10. The source-standardize servo-motor 102 is mechanically connected to the movable arm 64 of the source-standardize potentiometer 63. A relay 104 controls the positions of the contact arms 76, 85 and 89. One terminal of the relay 104 is connected by a line 105 to ground as indicated at 10, and the other terminal of the relay 104 is connected by a line 106 to the automatic program control 51.

Prior to any operation of the circuit of Figure 1, the amplifier 9 must be zero-standardized. In this procedure, the zero switch arm 92 is first closed to the contact point 94 by the zero-standardize relay 95 actuated by the automatic program control 51, shorting out all input signals to the amplifier 9. The condition which must be met is that no current should be allowed to flow through the feedback resistor 44 or through the low-impedance input of the amplifier-recorder 45. (This is the condition of the amplifier which meets the requirement of "no signal" output for "no signal" input.) Adjusting the zero potentiometer 17 will vary the D. C. level of voltage at the plate of the electrometer tube 15. This will in turn vary the voltage at the grid 34 and the cathode 38 of the cathode follower tube 32. Thus by adjusting the zero potentiometer 17 there is some point at which the voltage at the cathode of the cathode follower tube 32 will exactly balance out the voltage at the point 43 caused by the voltage source 41, and no current will flow through the feedback resistor 44.

The operation of the zero potentiometer 17 is accomplished automatically by mechanically linking the zero potentiometer arm 18 to the mechanical output of the zero-standardize servo-motor 19 which is controlled by the amplifier-recorder 45 through the output line 46, the contact arm 47, the contact point 49, and the line 99. Since the movement of the zero-standardize servo-motor 19 depends upon current flowing through the input to the amplifier-recorder 45, and the fact that the circuit is zeroed when no current flows through the input to the amplifier-recorder 45, the zero-standardize servo-motor 19 will stop adjusting the zero-potentiometer arm 18 when the circuit is zero-standardized. i. e., when no current flows through the feedback resistor 44.

After the zero-standardization is completed, the zero switch arm 92 is opened to the floating contact point 93, and the instrument is ready to measure.

When the circuit is in balance, that is, when all input signals have been balanced out by means of the opposing voltage from the point 43 to the point 91, the voltage developed across the high resistance 5 is exactly equal and opposite to the voltage across the opposing voltage from the point 43 to the point 91. At this time there is no voltage being fed back across the feedback resistor 44, so the point 7 is at ground potential, and therefore the line 8 and the control grid 33 of the electrometer tube 15 are also at ground potential.

Now if the ionization current is changed due to a different amount of radiation falling upon the ionization chamber 3, the voltage developed across the high resistance 5 will vary. As an example, let us assume the current increases. This will increase the voltage across the high resistance 5, and therefore the control grid 33 of the electrometer tube 15 will be at a potential more positive than ground potential. This will cause the voltage at the plate 23 to decrease because of greater conduction of the electrometer tube 15. Thus the potential at the grid 34 of the cathode follower 32 decreases. In a cathode follower stage, the cathode of the tube tends to follow the potential of the grid, so here the potential at the cathode 38 of the output tube 32 also decreases. This makes the voltage on the line 39 more negative than it was just before the increase in ionization current.

The decrease of voltage on the line 39 will upset the balance in the feedback circuit, and current will flow from the balance battery 41, thereby driving the point 43 to some potential negative with respect to ground potential. The voltage appearing across the feedback resistor 44 will thus tend to balance out the increase in voltage across the high resistance 5. The voltage drop across the feedback resistor 44 produces a current through this resistor 44 and through the low-impedance input to the recorder-amplifier 45. However, this feedback does not completely balance the input circuit to the amplifier. In order to maintain the feedback voltage across the feedback resistor 44, the grid 33 of the electrometer tube 15 will establish a point of balance at some slightly positive voltage, but not nearly as great as the positive potential due to voltage across the high resistance 5 alone. This balance will be almost instantaneous, depending only upon the slight time delay of the amplifier. Due to this immediate feedback, the grid of the electrometer tube 15 will never have a total variation of more than a small fraction of the voltage developed across resistance 5, even in the event of sudden large changes in voltage across the high resistance 5.

The current through the low-impedance input to the amplifier-recorder 45 provided by this electrical feedback will cause the output of the amplifier-recorder 45 to energize the indicator servomotor 54. This indicator servomotor 54 will then vary the amplitude of the opposing voltage, and within a period of time determined by the speed of the indicator servomotor 54, the opposing voltage will reach an amplitude that is equal and opposite to the voltage developed across the high resistance 5. As the opposing voltage approaches its ultimate value, the magnitude of the feedback voltage will necessarily be decreasing. When the opposing voltage has become exactly equal and opposite to the voltage across the high resistance 5, there will be no more feedback voltage, no current to the input of the amplifier-recorder 45, and therefore the indicator servomotor 54 will stop.

In the usual type of measuring circuit, such as a recording type pyrometer, the systems are standardized by comparing a portion of the measuring circuit voltage with a standard voltage, this standard voltage usually being a standard cell of constant voltage. Then the circuits are adjusted so that the portion of the measuring circuit voltage is exactly equal to the voltage of the standard cell.

This type of standardization would not be suitable for the radiation thickness gauge, since it is the relative variations in the ionization current that are being measured, not the absolute values. This relative value of ionization current is taken as being relative to the maximum value of the current possible, that is, the ionization current that flows when there is no absorber between the radiation detector 3 and the source of radiation 1. Since the voltage developed across the high resistance 5 is proportional to the value of the ionization current, the actual measuring then is of the relative value of voltage developed across the high resistance 5. A given material 2 of a given thickness placed in the measuring gap will always result in the same percent reduction in received radiation and in voltage across the high resistance 5.

Since the adjustment of the opposing voltage for standardization must be proportional to the change in the absorption characteristics, it is apparent that there must be some way of determining the magnitude of the change in the absorption characteristics. The most easily determined point on these characteristics is that point at which there is no absorber, since the condition of "no absorber" or zero thickness is the easiest to duplicate. For standardization a series of steps must be taken. As explained above, the first step is to zero-standardize the amplifier 9, so that all extraneous signals from the amplifier circuit are eliminated. Second comes source-standardization, in which we are not interested in any voltage that appears between the center-scale-equivalent point 72 and the movable arm 86 of the span potentiometer 81, since this voltage is a function of variations about a center thickness and does not affect the center thickness reading. This voltage may be eliminated by switching means described below so that none of the span voltage appears in the opposing voltage of the circuit during source standardization.

The next step is to adjust the center-scale potentiometer arm 74 to the setting that corresponds to the condition of "no absorber." Then, when the material 2 is removed from the path of radiation, there should be no signal received at the input point 7 to the amplifier 9 and thus to the amplifier-recorder 45. However, if the absorption characteristics have varied, there will be a signal received by the amplifier-recorder 45. During standardization, the output line 46 of the amplifier-recorder 45 is connected through the contact arm 47, the contact point 50 and the line 101 to the source-standardize servo-motor 102 which adjusts the movable arm 64 of the source-standardize potentiometer 63. Thus when any signal is received by the amplifier-recorder 45, the opposing voltage will be automatically adjusted until this signal is balanced out by the opposing voltage circuit. At this time then, the center scale voltage will have necessarily been varied in an amount proportional to the variation in the absorption characteristics. And, as described previously, the voltage span will also have been changed so that the weight per unit area or thickness span is constant.

Since the source-type drift changes the absorption characteristics proportionally at all points as is explained hereinafter, and since the center scale voltage has been adjusted at one point in this same proportion, the setting of center scale voltage will be correct for all points on the absorption curve.

In order to simplify the process of standardization, many of the necessary steps are done by switching. The movable contact arm 89 serves to remove the span voltage from the circuit, disconnecting the output line 90 of the circuit from the contact point 87 which is connected to the adjustable arm 86 of the span potentiometer 81 to the contact point 88 which is connected by the line 71 to the center-scale-equivalent point 72 where no span voltage appears. The movable contact arm 85 is moved from the contact point 83 at the end of the resistor 82 to the floating contact point 84 thereby disconnecting the span potentiometer 81 from the circuit, so that there is no danger that this span potentiometer 81 might have a loading effect on the circuit. The movable contact arm 76 is moved from the contact point 75 to the contact point 68 which is connected to the adjustable arm 67 of the source-standardize center-scale-setting potentiometer 66, eliminating the necessity of turning the arm 74 of the center scale potentiometer 73 to a position that corresponds to "no absorber." The arm 67 of the potentiometer 66 is preset to this position, so that merely switching the contact arm 76 from the contact point 75 to the arm contact point 68 accomplishes the same result. It is usually the case that the end of the center scale potentiometer 73 connected to the line 60 nearly corresponds to "no absorber," but because of a small amount of residual resistance in each end of the potentiometer 73 it would not serve the purpose to eliminate the additional potentiometer 66 and just switch the contact arm 76 to the line 60. The source-standardize relay 104, which is energized by the automatic program control 51 through the line 106, is operatively connected to all three of the movable contact arms 89, 85, and 76, as is indicated in Figure 1; and the switching operations described above for source-standardization are provided by the simultaneous movement of the three contact arms 89, 85, and 76 by the relay 104.

The resistors 80 and 82 limit the range of voltage spans available by limiting the fraction of the total available voltage span that the instrument is capable of using. The advantage of such a system is that for the same rotary motion of the span potentiometer arm 86, better resolution in setting the span may be obtained.

Figure 2:
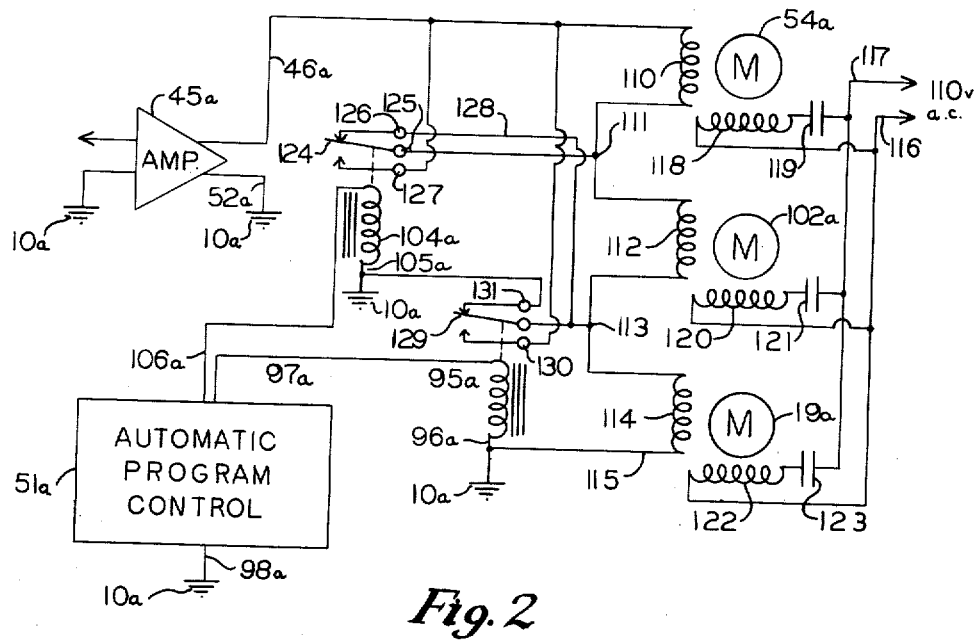
Figure 2 is a schematic view, partially in block-diagram form, illustrating a form of a motor switching circuit useful in the practice of this invention.

Figure 2 illustrates a modified form of a motor switching circuit which may be substituted for the simplified form included in the circuit of Figure 1. In Figure 2, the amplifier-recorder designated generally by 45a is grounded as indicated at 10a, through the line 52a. The output line 46a of the amplifier-recorder 45a is connected to one terminal of a winding 110 of the indicator servo-motor 54a, which is a two-phase motor. The opposite terminal of the motor winding 110 is connected to the point 111. The point 111 is connected to one terminal of a winding 112 of the source-standardization servo-motor 102a, which is a two-phase motor. The other end of the motor winding 112 is connected to a point 113. The point 113 is connected to one terminal of a winding 114 of the zero-standardizing servo motor 19a, which is a two-phase motor. The opposite terminal of the motor winding 114 is connected by a line 115 to ground as indicated at 10a.

Two lines 116 and 117 are connected to a suitable A. C. voltage source such as the usual 110-volt A. C. power lines. Connected in a series across the lines 116 and 117 are a second winding 118 of the two-phase indicator servo-motor 54a and a phase-shift condenser 119, which provides the proper phase relationship between the current to the winding 118 and any current to the winding 110 of the two-phase indicator servo-motor 54a. Similarly the second winding 120 and the phase-shift capacitor 121 of the two-phase source standardization servo-motor 102a are connected in series across the lines 116 and 117, providing the proper phase relationship between the current to the motor winding 120 and any current in the winding 112 of the source-standardization servo-motor 102a. The second winding 122 of the two-phase zero-standardization servo-motor 19a is similarly connected in series with the phase-shift capacitor 123 across the lines 116 and 117, providing the proper phase relationship between the current through the motor winding 122 and any current in the motor winding 114 of the two-phase zero-standardization servo-motor 19a.

A movable contact arm 124 is connected by a line 125 to the point 111. Associated with the movable contact arm 124 are two contact points 126 and 127. The contact point 126 is connected by a line 128 to the point 113, and to a movable contact arm 129. The contact point 127 is connected to the amplifier-recorder output line 46a, which also is connected to a contact point 130. The movable contact arm 129 is associated with the contact point 130 and with a second contact point 131 which is connected to the line 115 and to ground as indicated at 10a.

The automatic program control 51a is grounded as indicated at 10a, through the line 98a. The line 97a from the automatic program control 51a is connected to one end of the zero relay coil 95a, the other end of which is connected by the line 96a to ground as indicated at 10a. The zero relay coil 95a controls the position of the movable contact arm 129, which is associated with the contact points 130 and 131. The line 106a from the automatic program control 51a is connected to one end of the source relay coil 104a, the other end of which is connected by the line 105a to ground as indicated at 10a. The source relay coil 104a controls the position of the movable arm 124, which is associated with the contact points 126 and 127.

During measurements neither of the relay coils 95a nor 104a is energized, and the movable contact arms 124 and 129 are in the positions shown in Figure 2, with the movable contact arm 124 in engagement with the contact point 126 and with the movable contact arm 129 in engagement with the contact point 131. With the movable contact arms 124 and 129 thus connected, any output from the amplifier-recorder 45a will be connected by the output line 46a through the motor winding 110 of the two phase indicator servo-motor 54a, to the point 111, through the line 125, the contact arm 124, the contact point 126, the line 128, the contact arm 129, the contact point 131, and the line 115 to ground as indicated at 10a.

The point 111 is connected through the line 125 to the contact arm 124, the contact point 126 and the line 128 to the point 113, thus shorting out the motor winding 112 of the two-phase source servo-motor 102a. The point 113 is connected through the line 128 to the contact arm 129, contact point 131, and the line 115 to the opposite end of the winding 114, thus shorting out the winding 114 of the two-phase zero servo-motor 19a. Therefore, in this case, any output from the amplifier-recorder 45a will provide rotation of the two-phase indicator servo-motor 54a, but will not produce any rotation of the other two motors 102a or 19a.

When the automatic program control energizes the source relay coil 104a, but not the zero relay coil 95a, the circuit is the same as is shown in Figure 2 except that the movable contact arm 124 moves away from the contact point 126 and makes contact with the contact point 127. In this situation the amplifier-recorder output from the line 46a is connected to the contact point 127 and the contact arm 124, and through the line 125, to the point 111, through the winding 112 of the two-phase source servo-motor 102a, to the point 113, through the line 128, the contact arm 129, the contact point 131, and the line 115 to ground as indicated at 10a. The motor winding 110 of the indicator servo-motor 54a is shorted from the line 46a at one end of the winding 110 to the contact point 127, through the contact arm 124, to the line 125, to the point 111 at the opposite end of the winding 110. The winding 114 of the zero servo-motor 19a is shorted as in the former case from the point 113 through the line 128, the contact arm 129, the contact point 131, and the line 115 to the opposite end of the winding 114. Therefore, in this case, any output from the amplifier-recorder 45a provides rotation of the two-phase source servo-motor 102a, but does not provide any rotation of either of the other two servo-motors 54a or 19a.

When the automatic program control 51a energizes the zero relay coil 95a, the movable contact arm 129 is moved away from contact with the contact point 131 and is moved down to engage the contact point 130. In this case any output from the amplifier-recorder 45a is connected by the line 46a to the contact point 130, through the contact arm 129 to the point 113, through the winding 114 of the two-phase zero servo-motor 19a, and through the line 115 to ground as indicated at 10a. The other two windings 110 and 112 in this relay circuit are shorted regardless of the position of the movable contact arm 124, since the line 46a which is connected to one end of the winding 110, is connected to the contact point 130 through the contact arm 129 and the line 128 to the point 113, thus shorting out both of the windings 110 and 112. Therefore, in this case, any output from the amplifier-recorder 45a provides rotation of the two-phase zero servo-motor 19a, but provides no rotation of either of the other two motors 54a or 102a, regardless of whether the source relay coil 104a is also energized.

Figure 3:
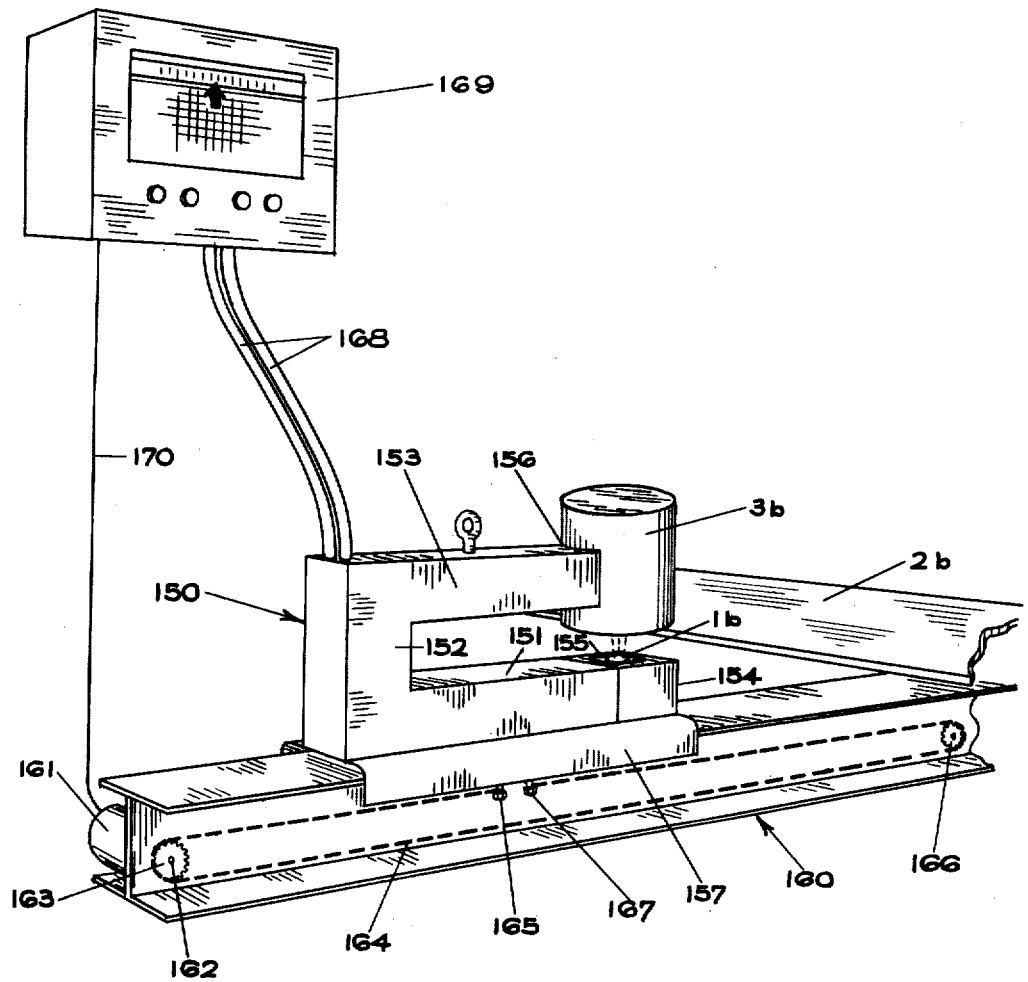
Figure 3 is a view partially in perspective and partially in block-diagram form illustrating mechanical elements as well as electrical elements of a thickness measuring gauge in accordance with this invention.

Figure 3 illustrates one form of mechanical means for supporting the source of radiation 1b and the radiation detector 3b, and means for positioning the same for thickness measurements of the material 2b and for removing the source of radiation 1b and the radiation detector 3b from the material 2b for source standardization with no absorbing material between the source of radiation 1b and the radiation detector 3b. A rigid U-bracket indicated generally by the numeral 150, comprises a lower horizontal portion 151, a vertical portion 152 and an upper horizontal portion 153. In the end 154 of the lower portion 151 of the rigid U-bracket 150 is provided a receptacle 155 in which the source of radiation 1b is held in the proper position to provide radiation directed upward toward the radiation detector 3b which is mounted at the end 156 of the upper portion 153 of the rigid U-bracket 150.

The lower horizontal portion 151 of the U-bracket 150 is rigidly connected to a channel-shaped member 157 which is mounted upon a track 158 formed by the upper horizontal surface 159 of an I-beam 160 positioned as shown in Figure 3. Conventional bearings between the channel member 157 and the I-beam 160, hidden from view in Figure 3, permit the channel member 157 and the U-bracket assembly 150 to move easily along the longitudinal path of the I-beam 160. A motor 161 whose shaft 162 is connected rigidly to a driving sprocket at 163, is mounted on the I-beam 160. A driving chain 164 is connected at one end to a bolt or other suitable fastening means 165 and forms a driving loop from the connecting means 165 around the driving sprocket 163 and an idler sprocket 166, and the other end of the chain is connected to the channel member 57 by another bolt or other suitable connection 167. It is apparent from Figure 3 that clockwise rotation of the motor shaft 162 will move the U-bracket assembly toward the material to be measured 2b and that counterclockwise rotation of the motor shaft 162 will move the U-bracket assembly 150 away from the material 2b. Flexible electrical cables 168 connect the radiation source 1b and the radiation detector 3b to the console 169, which contains the amplifying and recording equipment and the automatic program control. Electrical cables 170 connect the drive motor 161 to the console 169.

There are two main types of errors that may arise in null-balance gauges. The first of these is known as zero drift, and may be described as any shift in the operating level of the direct coupled amplifier 9. The second type of error is known as a source-type drift. This latter type of drift may be caused by a decay in the amount of radiation, or by variation in the electrical components which constitute the input circuit of the amplifier. By variation, or change, in the components or geometry is meant any change which has an undesirable effect upon the calibration of the instrument.

Zero drift is purely a function of the D. C. amplifier 9 and may be corrected within the amplifier. The condition that must be met is stated thusly; when there is no input signal to the amplifier, there must also be no output voltage. The method of accomplishing this is to adjust the bias of one of the amplifier tubes. The zero switch arm 92 is first closed, shorting out all input voltages to the amplifier 9. The zero-adjust potentiometer arm 18 is then adjusted until the voltage at the point 43 is zero. This adjustment will correct for long-time variations in the amplifier.

Any variation in the system that causes a proportional change in the absorption characteristics is known as a source-type drift. This is more clearly seen in Figure 4. $E_{dev}$ is the voltage that is developed across the high resistance 5 due to ionization current. Curve No. 1 represents the absorption curve under normal operation. If no absorber is intercepting the radiation, a voltage $E_a$ will be developed across the high resistance 5.

If an absorber of any thickness $T_0$ is placed so that it intercepts the radiation being emitted from the radioactive source, the amount of radiation reaching the radiation detector 3 will be less, and consequently the ionization current will be less. This results in $E_{dev}$ being smaller, being now of a value $E_0$.

Assume that because of some variation in the system, the voltage $E_{dev}$ is decreased to a value of voltage $E_b$ with no absorber. Then the value of $E_{dev}$ corresponding to the absorber of thickness $T_0$ will be $E_0'$. If the ratio of $E_0$ to $E_0'$ for every thickness of the same absorber is a constant and is equal to the ratio of $E_a$ to $E_b$, then the absorption curve has been subject to a proportional change, or a source-type drift.

One of the more common causes of source-type drift, or proportional drift, is that of radioactive source decay. As has been previously stated, as the source decays there will be less disintegration occurring in a given time, but the percentage of particles given off at any energy level will always be the same. Thus the shape of the energy distribution curve remains the same. Since the shape of an absorption curve depends upon the shape of the energy distribution curve, it is seen that the effect of decay, having no effect upon the energy distribution, will also have no effect upon the shape of the absorption curve.

There are several other important causes of source-type drift. Any change in resistance of the high resistance 5 will cause source-type drift. Drifts in the opposing voltage supply will also have the effect of a source-type drift.

The thickness gauge does not measure the entire range of the absorption curve. Thus in Figure 4, a gauge may be measuring a range of thicknesses from $t_1$ to $t_2$. The limits of voltage that appear across the high resistance 5 would then be $e_1$ and $e_2$. Now if the absorption characteristics change so that the absorption curve follows curve No. 2 in Figure 4, the limits of voltage appearing across the high resistance 5 would be $e_3$ and $e_4$.

It is to be emphasized that as we measure over a small distance on the absorption curve, it may be assumed that the curve is linear, or a straight line. Thus from point A to point B in Figure 4 the absorption curve will be nearly a straight line. The curve from point A' to B' would similarly be a straight line.

The total maximum excursion that an indicator will be capable of showing is known as span. Span may be indicated in several different ways, such as voltage span, the difference of voltage developed across the high resistance 5 that will cause a full scale deflection on the indicator; the milligram span, the number of milligrams per square centimeter change in weight of absorber that will produce a full scale deflection; the thickness span, the change in thickness of an absorber that will cause a full scale deflection on the indicator. Span may also be expressed as the percent of the total absorption curve that will give a full scale deflection.

Figure 4:
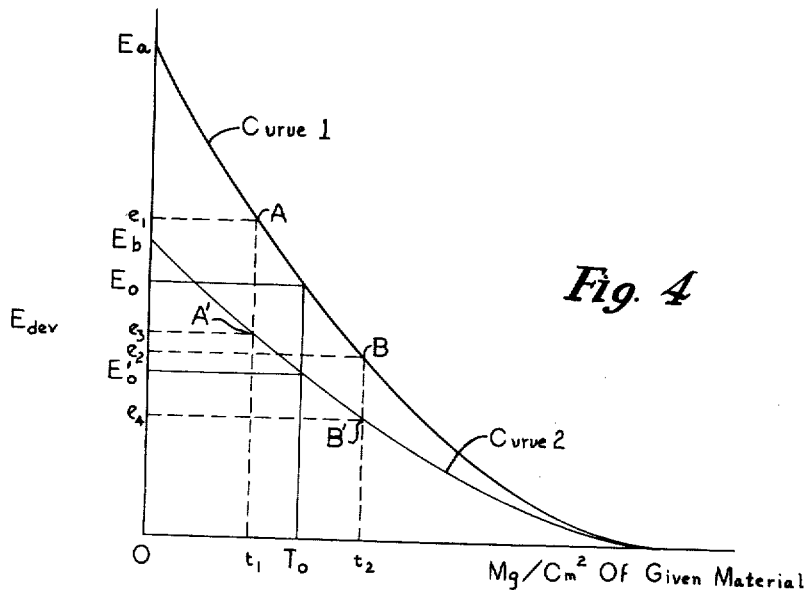
Figure 4 is a graph comprising voltage-response curves used in explaining principles relating to the invention.

Thus, referring to Figure 4, if the minimum weight of material that an indicator will show is $t_1$ mg. per square centimeter, and the maximum weight of material that the indicator will show is $t_2$ mg. per square centimeter, the span of the indicator would be $t_2-t_1$ mg. per square centimeter for full scale deflection. Similarly the voltage span of the instrument would be $e_1-e_2$ volts for full scale deflection on curve No. 2.

It is of major importance to a thickness gauge that its readings be reproducible. That is, for a given absorber material of given thickness the indicator must always give the same reading, independent of either source or zero drifts. The source-type drift affects both the voltage developed for center thickness, and the voltage span of the gauge. It is necessary then to determine in what manner these voltages vary, in order to correct the instrument properly.

Referring again to curve No. 1 in Figure 4, it is seen that the developed voltage $E_{dev}$ for no absorber will be 100 percent of the available developed voltage. Now as an absorber $T_0$ is placed in the path of the radiation, the resulting developed voltage will be $E_0$. Let us also assume that we desire a thickness span of plus or minus ten percent of the center thickness $T_0$. For the sake of this example, assume that a ten percent variation in the thickness will cause a seven percent change in the developed voltage. If a source-type drift occurs so that the developed voltage for "no absorber" is now $E_b$, curve No. 2 will be the new absorption curve. In this second case, $E_b$ will now be 100 percent of the available developed voltage. If the same absorber $T_0$ is placed in the path of the radiation, the resulting developed voltage will once again be 52 percent of the total available developed voltage, or in this case, 52 percent of $E_b$. Variations of plus or minus ten percent in the thickness of $T_0$ will still result in plus or minus seven percent variations in the developed voltage.

Thus from the percentage analysis of the voltage changes due to source drift, it is seen that if the "no absorber" developed voltage is used as a basis of the percentages, source drift will not have any effect upon them. That is, the voltage span will always remain a certain percent of the total available developed voltage. From this it follows that if the "no absorber" developed voltage is corrected to compensate for source-type drift, the voltage span is thereby corrected in the same percentage.

A null-balance circuit must meet the conditions listed below in order to be capable of complete standardization for all source and zero type drifts. It is assumed, of course, that the absorption curve is substantially linear within the limits of the measured span.

*Condition 1.*—The opposing voltage must be capable of being varied so that it can balance out the voltage across the high resistance. The percentage change in this opposing voltage must be the same as the percentage change in the voltage across the high resistance resulting from source-type drift.

*Condition 2.*—The voltage span of the opposing voltage circuit must be variable, and this variation must be by the same percentage as the percentage change in voltage across the high resistance resulting from source-type drift.

*Condition 3.*—The amplifier must be capable of being adjusted so that it always operates at a fixed D. C. level for one given input level.

In normal measuring conditions, the zero and source-standardize functions are de-energized, and a material 2 being measured is intercepting the radiation emitted from the radiation source 1. In order to source standardize the instrument, no absorber can be in the path of the radiation, since the determination of how much source drift has occurred must be made when all of the radiation emitted from the radiation source 1 is reaching the radiation detector 3. The most convenient way of removing the absorber from the path of radiation is to draw the entire source-detector unit away from the material 2, since in most applications the absorber material 2 is a continuous sheet of rolling stock.

In order to start the standardization cycle a signal is obtained every half hour from a timer 232. This signal causes the gauge immediately to clamp and zero. While the circuit is clamped and zeroing, a traversing motor 161 is withdrawing the gauge from the vicinity of the absorber material 2. Clamping and zeroing at this time serves two functions. First it is necessary to zero the amplifier 9 prior to source standardizing. Clamping, or shorting out input signals to the amplifier 9 is a necessary part of the zeroing operation. The second reason for clamping during the withdrawal of the instrument from the absorber material 2 is to stop the indicator 56 at its measuring position so that as soon as standardization is complete the gauge will measure without having to wait for the indicator 56 to return to its position. Clamping at this time will also eliminate the effect of circuit pulses that may be due to pickup of extraneous signals from the traversing motor 161.

When the gauge has been withdrawn completely from the absorber material 2 it will stop. This position is conveniently referred to as "off sheet." Shortly after the "off sheet" position is reached the source standardize functions will be energized. However the instrument will not be source standardizing at this time since the zero and clamp functions, still being energized, will take precedence. A short time overlap of the source standardize and zero functions is essential so that pulses are not generated in the circuit due to operation of the source relay 215. After this overlap period, the instrument ceases to clamp and zero, and will thus be source standardizing. After several seconds time allotted for complete source standardization, the clamp and zero functions are reenergized. A short overlap period is provided before the source standardize function is deenergized in order to eliminate switching pulses. Shortly after the zero and clamp functions are reenergized the traversing motor 161 receives a signal and return the gauge to its original measuring position on the absorber. When the gauge reaches this position, the gauge ceases to clamp and zero, and once more will be measuring normally.

Figure 5:
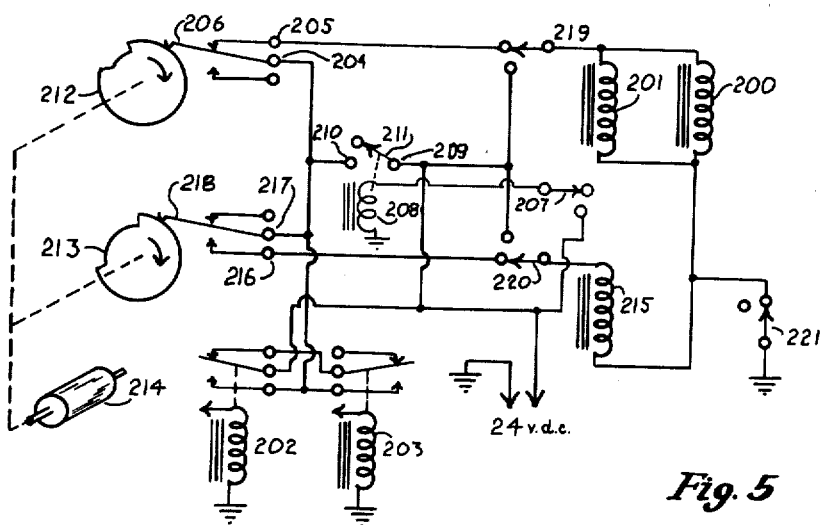
Figure 5 is a schematic view illustrating automatic switching and relay circuits according to this invention.

Referring now to Figure 5, the clamp relay 200 and the zero relay 201 are connected in parallel. Whenever the gauge is traversing, either the 202 or the 203 will be energized. This will apply energizing voltage to the clamp relay 200 and the zero relay 201 through the contacts 204 and 205 of the zero microswitch 206.

An "off sheet" switch 207 is provided so that the operator may withdraw the gauge from the absorber material 2 at any time. This off sheet switch 207 energizes the off-sheet relay 208. While the gauge is so withdrawn from the sheet it is desired that the circuit be clamped so that pulses will not reach the electrometer. The clamp relay 200 will thus be energized by the D. C. voltage source through the contacts 209 and 210 of the off sheet relay 211 and the contacts 204 and 205 of zero microswitch 206.

The zero cam 212 and the source cam 213 are turned by a one minute synchronous timer 214. The cams are shown in their normally operating position. This timer 214 will not be turning during normal operation of the gauge. It will be energized only when the standardize signal appears (generally every half-hour), and the gauge reaches the off-sheet position as a result. The timer will make only one revolution, requiring a separate standardize signal for each revolution.

The source relay 215 can normally be energized only through the contacts 216 and 217 of the source switch 218. This source microswitch 218 is closed only for a short time during the revolution of the source cam 213.

The zero switch 219 and the source switch 220 are provided for testing purposes. If it is desired to standardize the instrument without having to wait for full revolution of the one minute timer, the zero switch 219 and the source switch 220 may be used. These switches apply the energizing voltage directly to their respective relays.

The "normal-sample" switch 221 is also shown in Figure 5. Frequently in the use of the gauge it is desired to check the thickness of samples of materials. This cannot usually be done with the gauge in the measuring position, and so must be done with the gauge in the off-sheet position, or completely withdrawn from the absorber material 2. With the gauge in the off sheet position, the off sheet relay 211 is energized, thus applying voltage to the clamp relay 200 and the zero relay 201. The function of the normal-sample switch 221 then is to open up the ground leg of the zero relay 201 and the clamp relay 200 so that the gauge can measure. Thus in the "sample" position, the instrument can never clamp or zero. This switch also opens the ground leg of the source relay 215 so that there is no danger of the gauge's attempting to standardize while samples are being measured.

Figure 6:
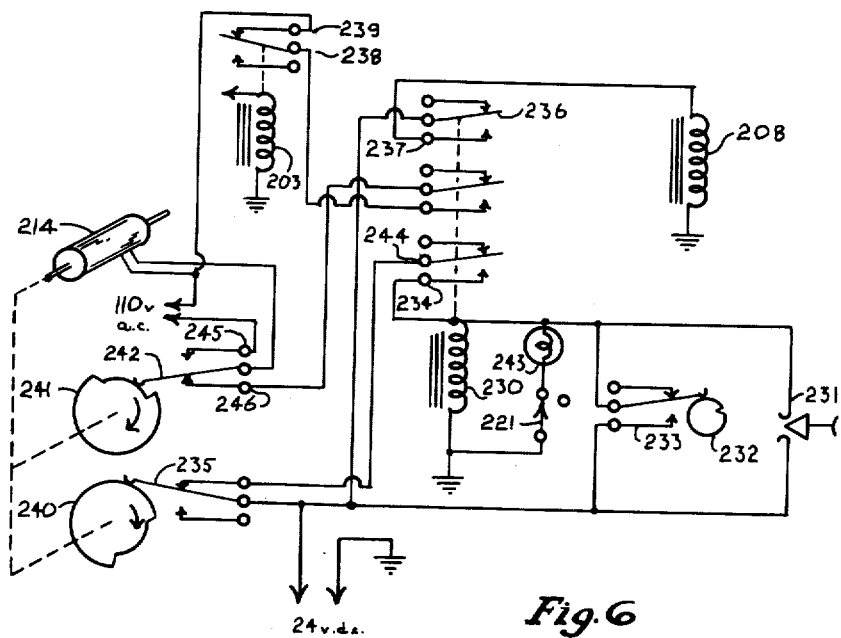
Figure 6 is a schematic view illustrating other automatic switching and relay circuits according to the invention.

Figure 6 illustrates the operation of the standardize relay 230 and the control of the one minute timer 214. The standardizing cycle is started by a standardize signal arising either from pushing the standardize push button 231 or periodic operation of the one-half hour timer 232 closing its microswitch 233. This signal applies the energizing voltage to the standardize relay 230. The standardize relay 230 will be held closed through its own contact 234 and through the in start switch 235. The closing of the standardize relay 230 will also energize the off-sheet relay 208 because the energizing voltage is applied to the off-sheet relay 208 through the contact arm 236 and the contact point 237.

Energizing of the off-sheet relay 208 causes the gauge to start to withdraw from the absorber as is further explained hereinafter. During this withdrawal, the "out" relay 203 is energized, thus opening the contacts 238 and 239 of the out relay 203. As soon as the gauge reaches the off-sheet position these contacts close again. This applies 110 volts A. C. to the windings of the one minute timer motor 214, thereby starting the timing cycle.

The one minute timer motor 214 operates four cams, the zero cam 206, the source cam 213, the "in start" cam 240, and the motor hold cam 241. The first two of these have been previously explained. The motor hold cam 241 serves to keep the one-minute timer motor 214 turning once it has been started, and to stop the one-minute timer motor 214 after one complete revolution. This is done by the operation of the motor hold switch 242. The in-start cam 240 operates the in-start switch 235 so that shortly after the source standardization has been completed the in-start switch 235 will remove the energizing voltage from the standardize relay 230, thereby opening the standardizing relay 230. This will cause the off-sheet relay 208 to open also, and as a result the gauge will be caused to return to its measuring position.

A standardize light 243 is connected in parallel with the standardize relay 230, so that whenever this relay 230 is energized the light 243 will come on. One pole of the normal-sample switch 221 is connected in series with this light 243, so if samples are being measured, thereby disenabling the standardizing functions, a false indication of standardization will not be given.

If the normal-sample switch 221 is in the sample position when a standardize signal is given, the entire cycle will occur normally except that the gauge does not actually clamp, zero, or source standardize, and the standardize light 243 will not light.

The sequence of operations involved in a standardizing cycle are briefly:

(1) A standardize cycle is initiated by either the standardize push button 231 or the one-half hour timer 232.

(2) The standardize relay 230 closes and the standardize light 243 comes on.

(3) The contacts 234 and 244 of the standardize relay 230 hold the standardize relay 230 on, and the contacts 236 and 237 of the standardize relay 230 energize the off sheet relay 208.

(4) The contacts 209 and 210 of the off-sheet relay 208 apply voltage for clamping and zeroing, and also cause the gauge to withdraw from the absorber.

(5) As the gauge is withdrawing, the circuit is clamped and is zeroing.

(6) When the gauge reaches the off-sheet position, the out relay 203 is de-energized, opening its contacts, thereby stopping the traversing motor 161. At this time power is applied to the one minute timer 214, which starts to turn its cams.

(7) The source cam 213 operates the source microswitch 218, closing the source relay 215. But this relay does not operate the source motor since the zero relay 201 is still energized.

(8) The motor hold cam 241 switches the power operating the one minute timer motor 214 directly to the 110-volt A. C. supply.

(9) The zero cam 212 opens the zero microswitch 206, thereby stopping the gauge from clamping and zeroing. This causes the source motor 102 to operate, since the source relay 215 is closed.

(10) The gauge source standardizes.

(11) After several seconds, the zero cam 212 closes the zero microswitch 206, thereby operating the clamp relay 200 and the zero relay 201. Thus the gauge will start to clamp and zero and cease to source standardize.

(12) The source cam 213 opens the source microswitch 218, thereby opening the source relay 215.

(13) The in-start cam 240 opens the in-start microswitch 235, thereby opening the standardize relay 230, and turning off the standardize light 243.

(14) Contacts 236 and 237 of the standardize relay 230 open, and thereby cease to energize the off-sheet relay 208, causing the gauge to start returning to the measuring position.

(15) The gauge, on reaching its measuring position, ceases to clamp and zero, and will thus be measuring.

(16) The in-start cam 240 closes the in-start microswitch 235, so that if another standardize signal is received from the standardize pushbutton 231 or the one-half hour timer 232 the standardize cycle will start over again.

(17) The motor-hold cam 241 switches the motor hold switch 242 from the contact point 245 to the contact point 246, thereby removing power from the one minute timer motor 214. Since the standardize relay 230 is not closed, no power will now reach the one minute timer motor 214, and the entire standardization cycle is complete.

Step number 15 does not necessarily have to occur before steps 16 and 17.

Since the thickness gauge is used primarily to measure the qualities of rolling stock, it is necessary to provide a traversing system that will allow the gauge to withdraw from the rolling stock for standardization. The traversing system also provides the feature that the gauge may be used to measure the thickness of the material at any point along the width of the material.

The only parts of the gauge that must actually be moved are the radiation source 1 and the radiation detector 3. These two units are mounted on a rigid U-shaped frame 150, or U-bracket. For traversing purposes the U-bracket 150 moves along an I-beam "track" 158. Mounted on the track 158 is a motor 161 which is used to drive the U-bracket 150 by a chain-drive system.

Figure 7:
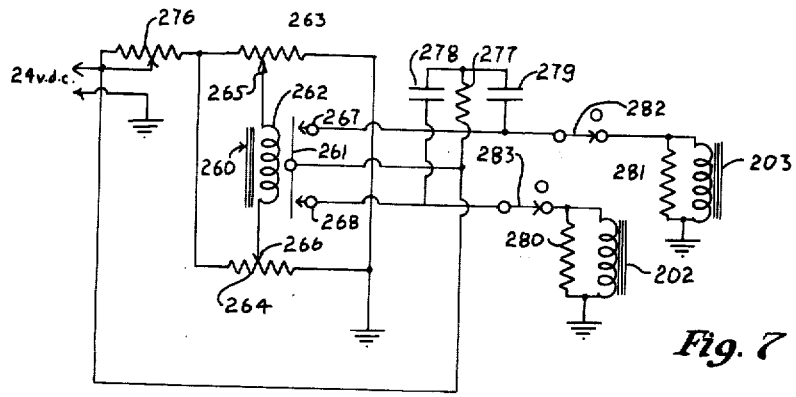
Figure 7 is a schematic diagram of an electrical circuit for providing control over the position of movable equipment in accordance with the present invention.

The basic circuit of the control system is the "polarized relay bridge" circuit, as shown in Figure 7. The relay 260 is a polarized relay, that is, the direction its arm 261 throws depends upon the direction of current flowing through the coil 262. The polarized relay 260 is used as the center leg of a bridge circuit consisting of the track potentiometer 263 and the position adjustment potentiometer 264.

The track potentiometer 263 is located on the track 158, and is driven by the U-bracket 150, that is, the position of its arm 265 is determined by the position of the U-bracket 150 on the track 158. The position adjustment arm 266 is pre-set, and determines at what position the U-bracket will stop.

The polarized relay 260 will apply voltage to either the out relay 203 or the in relay 202 depending upon which direction current is flowing in the coil 262 of the polarized relay 260. Operation of the out relay 203 will cause the U-bracket 150 to move toward the off-sheet position, while operation of the in relay 202 will cause it to move toward a measuring position on the material 2 being gauged. As the U-bracket 150 moves in either position, it is seen that the arm 265 of the track potentiometer 263 will also move.

Thus, if there is an unbalance between the arms 265 of the track potentiometer 263 and the arm 266 of the position adjustment potentiometer 264, a current will flow in the coil of the polarizer relay 260. This will cause one of the contacts 267 or 268 of the polarized relay 260 to close, thereby applying voltage to one of the traversing relays 202 or 203. The traversing relay 202 or 203 will then cause the traversing motor 161 to move the U-bracket 150, at the same time moving the arm 263 of the track potentiometer 265. When the arm 263 of the track potentiometer 265 reaches a position where there is no voltage across the coil 262 of the polarized relay 260, no current will flow through the polarized relay 260, and its contacts will open. This will open the traversing relay 202 or 203, and the U-bracket 150 will stop. Further movement of the U-bracket 150 can then only occur if the position adjustment arm 266 is moved.

The traversing motor 161 is a two-phase capacitor run motor. This is pictured in Figure 8. If the out relay 203 is closed, 110 volts A. C. is applied directly across the winding 271 of the traversing motor 161. The winding 272 will be in series with the phasing capacitor 273 and the resistor 274 across the 110 volt A. C. line. Thus the current through the winding 272 will not be in phase with the current through the winding 271. This phase shift will cause the motor to start and run in only one direction. The converse is true if the in relay 202 is closed and 110 volts A. C. is applied across the winding 272, with the winding 271 now connected in series with the phasing capacitor 275 and the resistor 274 across the 110 volt A. C. line. By this means the in relay 202 and the out relay 203 determine which direction the U-bracket 150 moves.

The voltage across the bridge is controlled by the sensitivity potentiometer 276. In order for the polarized relay 260 to close its contacts at least 0.15 volt must be across its coil 262. When the polarized relay contacts 269 and 268 open, there will be a small amount of drifting of the U-bracket 150 due to momentum. In order that the U-bracket 150 will always stop at the same place for a given setting of the position adjustment arm 266 no matter which direction the U-bracket 150 is traveling, it is necessary to adjust the voltage across the polarized relay bridge so that the polarized relay contacts 267 and 268 will open in time to have the U-bracket 150 stop at the right place.

The combinations of the resistor 277 and the capacitors 278 and 279 is a spark suppressor, reducing the amount of sparking at the contacts 267 and 268 of the polarized relay 260 by a filtering action.

The resistors 280 and 281 eliminate chatter at the contacts 267 and 268 of the polarized relay 260 by increasing the current that passes through them. If the current through the contacts 267 and 268 is too small, a voltage across the micropositioner coil 262 that is barely sufficient to hold the contacts 267 and 268 closed will cause them to chatter. As the contact load is increased, the contacts 267 and 268 will remain closed until a voltage appears across the coil 262 that is sufficient to completely open the contacts 267 and 268.

The out-limit switch 282 and the in-limit switch 283 stop the U-bracket 150 from running off the ends of the track 158, if due to some difficulty the out relay 203 or in relay 202 are not de-energized at the proper positions. These switches 282 and 283 are located on each end of the track 158, and open their respective traversing relays to stop the traversing motor 161 from driving the U-bracket 150 past the switch.

Figure 8:
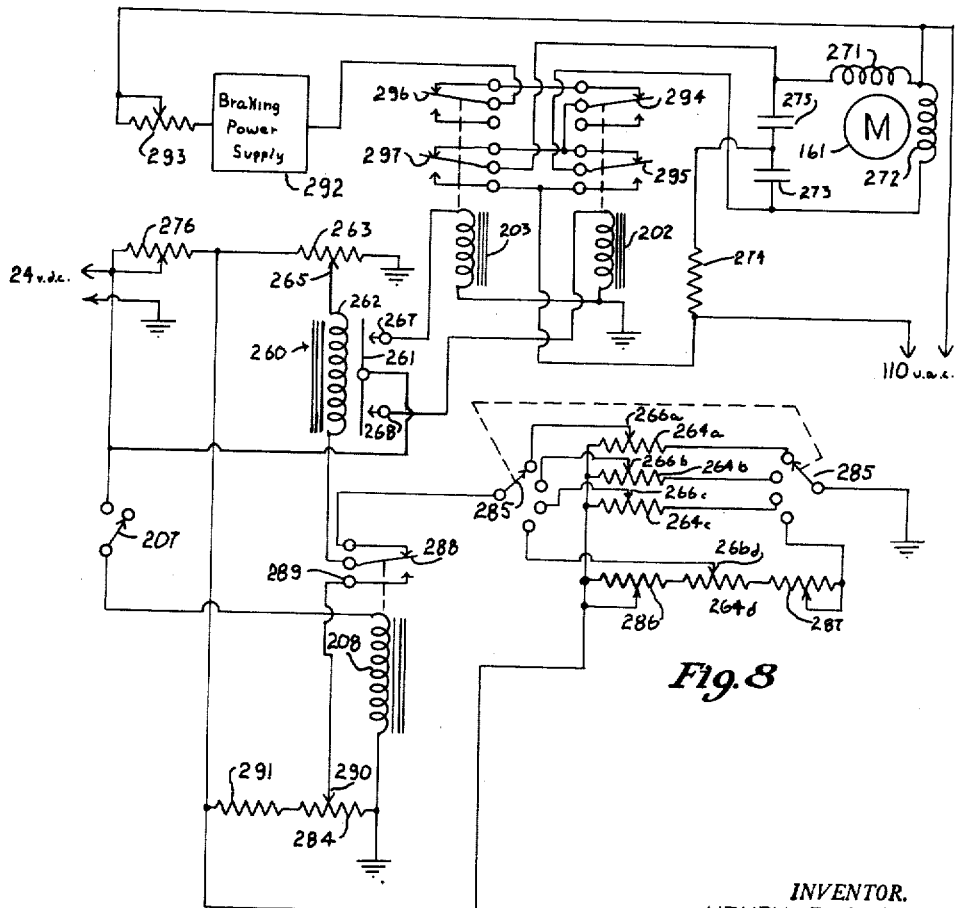
Figure 8 is a schematic view illustrating an improved position-control circuit of the type shown in Figure 7.

It is usually required that the U-bracket 150 be capable of being positioned readily at one end of several pre-set positions on the material being measured. This is done as shown in Figure 8. Either the off-sheet potentiometer 284, or one of the position adjust potentiometers 264a, 264b, 264c, or 264d may be switched to take the place of the position adjust potentiometer 264, of Figure 7. The position adjust potentiometers 264a, 264b, and 264c are pre-set to any desired position, and may be switched into the polarized relay bridge circuit by means of the position switch 285. It is usual to designate the three U-bracket positions obtainable by these potentiometers as positions No. 1, 2, and 3. The position adjust potentiometer 264d is a manual adjustment, allowing the operator to adjust the U-bracket 150 to any intermediate position over the material 2 being measured. The potentiometers 286 and 287 are pre-set span adjustments that determine the range of positions over which the manual position-adjust potentiometer 264d may be set, or in other words, they limit the range of voltages that may appear at the arm 266d of the position adjust potentiometer 264d by manual adjustment.

When the off-sheet switch 207 is closed, it energizes the off-sheet relay 208. In this case, the off-sheet adjust potentiometer 284 is switched into the polarized relay bridge circuit by the contact arm 288 and the contact point 289 of the off-sheet relay 208. The movable arm 290 of the off-sheet adjust potentiometer 284 is preset to determine the off-sheet position of the U-bracket 150, that is, it determines the distance that the U-bracket 150 traverses from the material 2 being measured. In this position, no part of the measuring part of the gauge should be over the material 2 being measured. When the gauge is applied in a rolling mill of any kind, the rolling stock is generally referred to as the "sheet," thus the derivation of the term "off-sheet." The resistor 291 limits the range of positions that may be set by the adjustable arm 290 of the off-sheet potentiometer 284, and eliminates the possibility of the gauge's being set over the sheet in the "off-sheet" position.

The control circuit for the traversing motor 161 is shown in Figure 8. The function of the circuit is to provide 110 volts A. C. in the proper phase relationships to the windings 271 and 272 of the motor 161 for traversing, and to provide a D. C. current through the windings 271 and 272 of the motor 161 for braking when the traversing motor 161 is not running.

Only one of the two traversing relays may be energized at any given time. When neither of them is energized, D. C. current from the braking power supply 292 flows through the two windings 271 and 272 of the traversing motor 161. The amount of D. C. current flowing through the motor 161 is adjusted by means of the braking adjustment potentiometer 293 so that the motor 161 will stop completely as soon as the in relay 202 and the out relay 203 are de-energized.

Energizing of either the in relay 202 or the out relay 203 moves either the contact arms 294 and 295 or the contact arms 296 and 297 from the upper position shown in Figure 8 to the lower position, and thereby removes the D. C. current from the motor windings 271 and 272 and applies 110 volts A. C. to one of these motor windings. The other winding gets its power through the phasing capacitor 273 or 275. The two capacitors 273 and 275 and the resistor 274 eliminate sparking at the contacts of the in relay 202 and out relay 203.

From the foregoing description it will be apparent that the present invention provides, in equipment used to measure the value of a variable characteristic translatable into voltage, a standardization system in which means are provided for standardizing to correct errors that might otherwise be present in translating the variable characteristic to be measured into voltage, and in which means are also provided for standardizing to correct errors that might otherwise arise in the measurement of such voltage. It will be understood, of course, that the invention is not limited to the specific forms or connections or arrangements of parts herein described and shown.

What is claimed is:

1. A thickness gauge comprising: a radiation source providing radiation directed toward a material to be measured; a radiation detector for detecting radiation from said material; means for providing a thickness-function voltage across a high resistance as determined by the rate of arrival of radiation to said radiation detector; means for providing a variable voltage opposing said thickness-function voltage; means for amplifying any difference between said thickness-function voltage and said opposing voltage; means actuated by any output voltage from said amplifying means for maintaining said opposing voltage equal to said thickness-function voltage; automatic means for adjusting said means providing said opposing voltage to prevent errors that might otherwise arise from changes in said means for providing said thickness-function voltage; and automatic means for adjusting said amplifying means to provide zero output voltage when the input voltage to said amplifying means is zero; in which said opposing voltage is capable of being varied so as to prevent any error that might otherwise arise because of source-type drift in said means for providing said thickness-function voltage; and in which said automatic means for adjusting said means providing said opposing voltage comprises means for varying said opposing voltage by the same percentage as the percentage change in said thickness-function voltage caused by said source-type drift for a given value of thickness of said material to be measured.

2. A thickness gauge comprising: a radiation source providing radiation directed toward a material to be measured; a radiation detector for detecting radiation from said material; means for providing a thickness-function voltage across a high resistance as determined by the rate of arrival of radiation to said radiation detector; means for providing a variable voltage opposing said thickness-function voltage; means for amplifying any difference between said thickness-function voltage and said opposing voltage; means actuated by any output voltage from said amplifying means for maintaining said opposing voltage equal to said thickness-function voltage; automatic means for adjusting said means providing said opposing voltage to prevent errors that might otherwise arise from changes in said means for providing said thickness-function voltage; and automatic means for adjusting said amplifying means to provide zero output voltage when the input voltage to said amplifying means is zero; in which said means for providing said opposing voltage comprises a voltage source and an electrical network, and in which said automatic means for adjusting said opposing voltage means comprises automatic means for providing across predetermined points in said electrical network an opposing voltage equal to said thickness-function voltage for a predetermined value of thickness of said material to be measured comprising a servomechanism actuated by any output voltage from said amplifying means and connected to vary the setting of an adjustable element in said means for providing said variable opposing voltage.

3. A thickness gauge comprising: a radiation source providing radiation directed toward a material to be measured; a radiation detector for detecting radiation from said material; means for providing a thickness-function voltage across a high resistance as determined by the rate of arrival of radiation to said radiation detector; means for providing a variable voltage opposing said thickness-function voltage; means for amplifying any difference between said thickness-function voltage and said opposing voltage comprising at least one electronic amplifying tube; means actuated by any output voltage from said amplifying means for maintaining said opposing voltage equal to said thickness-function voltage; automatic means for adjusting said means providing said opposing voltage to prevent errors that might otherwise arise from changes in said means for providing said thickness-function voltage; and automatic means for adjusting said amplifying means to provide zero output voltage when the input voltage to said amplifying means is zero comprising means for applying zero input voltage to said amplifying means including means for providing a short circuit across the input terminals of said amplifying means and automatic means for adjusting the voltage to an element of an electronic tube of said amplifying means to provide zero output voltage from said amplifying means for said zero input voltage including a servomechanism actuated by any output voltage from said amplifying means.

4. Means for standardizing a thickness gauge comprising: timer means for initiating the operation of said standardizing means; first relay means energized by said timer means to close a circuit; means actuated by said first relay means to maintain said first relay means in energized condition and means actuated by said first relay means to energize a second relay means; amplifying means in said thickness gauge; means actuated by said second relay means for providing a short circuit to the input terminals of said amplifying means and for adjusting said amplifying means to provide zero output voltage when said short circuit is present across said input terminals; means actuated by said second relay means for withdrawing said thickness gauge from the material to be measured; means for stopping the movement of said withdrawing means when said thickness gauge has been withdrawn from said material to be measured; means for removing said short circuit from said input terminals of said amplifying means and for terminating the operation of said means for adjusting said amplifying means; source-standardizing means for standardizing said thickness gauge to prevent errors that might otherwise arise from source-type drift; means for terminating the operation of said source-standardizing means; means for repeating the operation of said short circuiting means and said means for adjusting said amplifying means; means for returning said thickness gauge to said material to be measured; and means for terminating the operation of said short circuiting means and of said means for adjusting said amplifying means, and for permitting the thickness gauge to perform its normal measuring function.

5. The combination of claim 4 and means for providing a time overlap in said first operation of said short circuiting means and the operation of said source-standardizing means, and means for providing a time overlap in the operation of said source-standardizing means and said second operation of said short circuiting means.

6. Means for standardizing a thickness gauge comprising: amplifying means in said thickness gauge; means for providing a short circuit to the input terminals of said amplifying means and for adjusting said amplifying means to provide zero output voltage when said short circuit is present across said input terminals; means for withdrawing said thickness gauge from the material to be measured; means for stopping the movement of said withdrawing means when said thickness gauge has been withdrawn from said material to be measured; means for removing said short circuit from said input terminals of said amplifying means and for terminating the operation of said means for adjusting said amplifying means; source-standardizing means for standardizing said thickness gauge to prevent errors that might otherwise arise from source-type drift; means for terminating the operation of said source-standardizing means; and means for permitting said thickness gauge to perform its normal measuring function.

7. The combination of claim 6 and means for providing a time overlap in said first operation of said short circuiting means and the operation of said source-standardizing means, and means for providing a time overlap in the operation of said source-standardizing means and said second operation of said short circuiting means.

8. The combination of claim 6 in which said source-standardizing means comprises automatic means for adjusting an element of said thickness gauge to provide zero output voltage from said amplifying means under predetermined circuit conditions for a predetermined value of thickness.

9. A method of standardizing a thickness gauge having amplifying means, said method comprising: providing a short circuit to the input terminals of said amplifying means and adjusting said amplifying means to provide zero output voltage when said short circuit is present across said input terminals; withdrawing said thickness gauge from the material to be measured; stopping the movement of said withdrawing means when said thickness gauge has been withdrawn from said material to be measured; removing said short circuit from said input terminals of said amplifying means and terminating said adjusting of said amplifying means; source-standardizing said thickness gauge to prevent errors that might otherwise arise from source-type drift; terminating said source-standardizing operation; again providing a short circuit to the input terminals of said amplifying means and again adjusting said amplifying means to provide zero output voltage when said short circuit is present across said input terminals; returning said thickness gauge to said material to be measured; removing said short circuit from said input terminals of said amplifying means; and providing the normal measuring function in said thickness gauge.

10. A thickness gauge comprising; a radiation source subject to decay providing radiation directed towards a material to be measured, a radiation detector for detecting radiation from said material, means including said radiation source and radiation detector for providing across a high resistance a voltage which is a function of the thickness of said material as determined by the rate of arrival of radiation at said radiation detector, means providing a variable voltage opposing said thickness-function voltage, means for amplifying any difference between said thickness-function voltage and said opposing voltage, means actuated by any output voltage from said amplifying means for varying said opposing voltage and maintaining it equal to said thickness-function voltage, automatic means for adjusting said means providing said opposing voltage to prevent errors that might otherwise arise from changes in said means for providing said thickness-function voltage including decay of said source, and automatic means for adjusting said amplifying means to provide zero output voltage when the input voltage to said amplifying means is zero.

11. A thickness gauge according to claim 10 in which said means for amplifying any difference between said thickness-function voltage and said opposing voltage comprises at least one electronic amplifying tube, and in which said automatic means for adjusting said amplifying means comprises means for applying zero input voltage to said amplifying means and automatic means for adjusting the voltage to an element of an electronic tube of said amplifying means to provide zero output voltage from said amplifying means for said zero input voltage.

12. A thickness gauge according to claim 10 in which said means for providing said opposing voltage comprises a voltage source and an electrical network, and in which said automatic means for adjusting said opposing voltage means comprises automatic means for providing at predetermined intervals across predetermined points in said electrical network an opposing voltage varied by an amount proportional to any variation in said thickness-function voltage for a predetermined value of thickness of said material to be measured.

13. A thickness gauge according to claim 10 in which said means for providing said opposing voltage comprises a voltage source and an electrical network, and in which said automatic means for adjusting said opposing voltage means comprises automatic means for providing across predetermined points in said electrical network an opposing voltage equal to said thickness-function voltage for a predetermined value of thickness of said material to be measured.

14. A thickness gauge according to claim 13 in which said predetermined value of thickness is zero.

15. A thickness gauge according to claim 14 in which said zero thickness is provided by means for removing said radiation source and said radiation detector from said material to be measured.

16. In a gauging system for measuring a variable characteristic of a material moving in a first direction; a carriage movably mounted adjacent said material for movement in a second direction toward and away from said moving material, a radiation source mounted on said carriage and movable therewith into a first position in proximity to said material wherein radiation from said source is directed towards said material, and into a second position wherein said source is withdrawn from said material and the radiation is no longer directed towards said material; a radiation detector mounted on said carriage for movement therewith, said detector detecting radiation from said material only when said radiation source is in said first position; source standardizing means for standardizing said gauging system to prevent error that might otherwise arise from source-type drift; power means for moving said carriage; and control means for energizing said power means to move said carriage, source and detector into said second position and to effect source standardization when said source and said detector are in said second position.

17. In a gauging system for measuring a variable characteristic of a material moving in a first direction; a carriage movably mounted adjacent said material for movement in a second direction toward and away from said moving material, a radiation source mounted on said carriage and movable therewith into a first position in proximity to a first surface of said material, and into a second position wherein said source is withdrawn from said first surface of said material; a radiation detector mounted on said carriage opposite said source so that when said source is proximate said first surface of said material said detector is proximate a second surface of said material on the other side thereof; said detector detecting radiation from said source which passes through said material when said carriage, source and detector are in said first position, and detecting radiation direct from said detector when said carriage, source and detector are in said second position; source standardizing means for standardizing said gauging system to prevent errors that might otherwise arise from source-type drift; power means for moving said carriage; and control means for energizing said power means to move said carriage, source and detector into said second position and to effect source standardization when said source and said detector are in said second position.

18. An apparatus as set forth in claim 17 wherein said carriage comprises a C-shaped frame having an upper leg and a lower leg, said source being mounted on one of said legs and said detector being mounted on the other.

References Cited in the file of this patent
UNITED STATES PATENTS

| | | |
|---|---|---|
| 1,363,267 | Porter | Dec. 28, 1920 |
| 2,385,481 | Wills | Sept. 25, 1945 |
| 2,446,153 | Belcher | July 27, 1948 |
| 2,467,812 | Clapp | Apr. 19, 1949 |
| 2,512,702 | White | June 27, 1950 |
| 2,520,462 | Hartung | Aug. 29, 1950 |
| 2,551,964 | Norton | May 8, 1951 |
| 2,556,788 | Barnes | June 12, 1951 |
| 2,619,552 | Kerns | Nov. 25, 1952 |
| 2,684,999 | Goldberg | July 27, 1954 |
| 2,685,000 | Vance | July 27, 1954 |
| 2,734,949 | Berry | Feb. 14, 1956 |

FOREIGN PATENTS

| | | |
|---|---|---|
| 620,140 | Great Britain | Mar. 21, 1949 |

U. S. DEPARTMENT OF COMMERCE
PATENT OFFICE

CERTIFICATE OF CORRECTION

Patent No. 2,829,268     Henry R. Chope     April 1, 1958

It is hereby certified that error appears in the printed specification of the above numbered patent requiring correction and that the said Letters Patent should read as corrected below.

Column 21, line 28, for "detector", first occurrence, read -- source --.

Signed and sealed this 29th day of July, 1958.

(SEAL)
Attest:
KARL H. AXLINE
Attesting Officer

ROBERT C. WATSON
Commissioner of Patents

Dedication 2,829,268.—*Henry R. Chope*, Columbus, Ohio. STANDARDIZATION SYSTEM. Patent dated Apr. 1, 1958. Dedication filed Feb. 1, 1966, by the assignee, *Industrial Nucleonics Corporation*.

Hereby dedicates said patent.
[*Official Gazette April 19, 1966.*]